US008433506B2

(12) United States Patent
Saggio, III et al.

(10) Patent No.: US 8,433,506 B2
(45) Date of Patent: Apr. 30, 2013

(54) WEATHER DATA SELECTION RELATIVE TO AN AIRCRAFT TRAJECTORY

(75) Inventors: Frank Saggio, III, Grand Rapids, MI (US); Ana Isabel Del Amo Blanco, Ada, MI (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 13/173,156

(22) Filed: Jun. 30, 2011

(65) Prior Publication Data

US 2013/0006512 A1 Jan. 3, 2013

(51) Int. Cl.
*G06F 19/00* (2011.01)

(52) U.S. Cl.
USPC ................. 701/120; 701/3; 701/10; 701/415; 701/423

(58) Field of Classification Search .................... 701/10, 701/120, 415, 423
See application file for complete search history.

(56) References Cited

U.S. PATENT DOCUMENTS

2010/0049382 A1* 2/2010 Akalinli et al. ................ 701/14
2010/0198433 A1 8/2010 Fortier et al.
2012/0209515 A1* 8/2012 Klooster ...................... 701/439

* cited by examiner

*Primary Examiner* — James Trammell
*Assistant Examiner* — Jerrah Edwards
(74) *Attorney, Agent, or Firm* — McGarry Bair PC

(57) ABSTRACT

A method of providing weather information for an aircraft trajectory to a flight management system (FMS) includes selecting a unique subset of temperature data points from weather data points along an aircraft trajectory and sending corresponding weather data points to the FMS.

15 Claims, 3 Drawing Sheets

WEATHER DATA SELECTION RELATIVE TO AN AIRCRAFT TRAJECTORY

BACKGROUND OF THE INVENTION

In many contemporary aircraft, meteorological data at waypoints along an aircraft flight path may be considered for determining an estimated time of arrival and fuel burn during an aircraft's flight. For example, a flight management system (FMS) might consider wind direction, wind speed, and temperature data uploaded to the FMS from a ground station via a communications system while the aircraft is in flight or input by the pilot. While the amount of the available meteorological data is large and may include multiple points along or near the aircraft flight path, there are practical limits to the real-time use of this large amount of data. For example, the FMS may be limited in the number of data points where weather data may be entered. Typically, flight path data is provided to the FMS as the start point, the end point, and perhaps one or a few enroute waypoints. Such restrictions in the data can limit the accuracy of FMS predictions based on the data. Another practical limitation is the relatively high cost of transmitting the data to the aircraft, which is currently done by transmission over a subscription-based, proprietary communications system such as Airline Communications Addressing and Reporting System (ACARS).

BRIEF DESCRIPTION OF THE INVENTION

In one embodiment, a method of providing weather information for an aircraft trajectory to a flight management system (FMS) includes a) receiving the aircraft trajectory, b) selecting weather data points comprising both temperature and wind data along the received trajectory from a weather database to form a trajectory subset of weather data points, c) generating a reference temperature profile from the trajectory subset of weather data points, d) selecting a unique subset of temperature data from the trajectory subset to define a temperature subset of the weather data points, e) generating a temperature profile along the aircraft trajectory from the temperature subset, f) comparing the temperature profile to the reference temperature profile, g) repeating d-f until the comparison satisfies a predetermined threshold, h) identifying the weather data points from the trajectory subset that correspond to the unique subset of temperature data satisfying the predetermined threshold, and i) sending to the FMS the identified weather data points.

DESCRIPTION OF EMBODIMENTS OF THE INVENTION

A flight path for an aircraft generally includes a climb, a cruise, and a descent. While described in the context of a full flight path from takeoff to landing, the invention is applicable to all or any portion of the full flight path, including in-flight updates to an original flight path. For purposes of this description, the full flight path example will be used.

Most contemporary aircraft include a flight management system (FMS) for generating a flight path trajectory 10 and flying the aircraft along the flight path trajectory 10. The FMS may automatically generate the flight path trajectory 10 for the aircraft based on commands, waypoint data, and additional information such as weather data all of which may be received from an Airline Operation Center (AOC) or from the pilot. Such information may be sent to the aircraft using a communication link. The communication link may be any variety of communication mechanism including but not limited to packet radio and satellite uplink. By way of non-limiting example the Aircraft Communications Addressing and Reporting System (ACARS) is a digital datalink system for transmission messages between aircraft and ground stations via radio or satellite. The information may also be input by the pilot.

Figure 1:
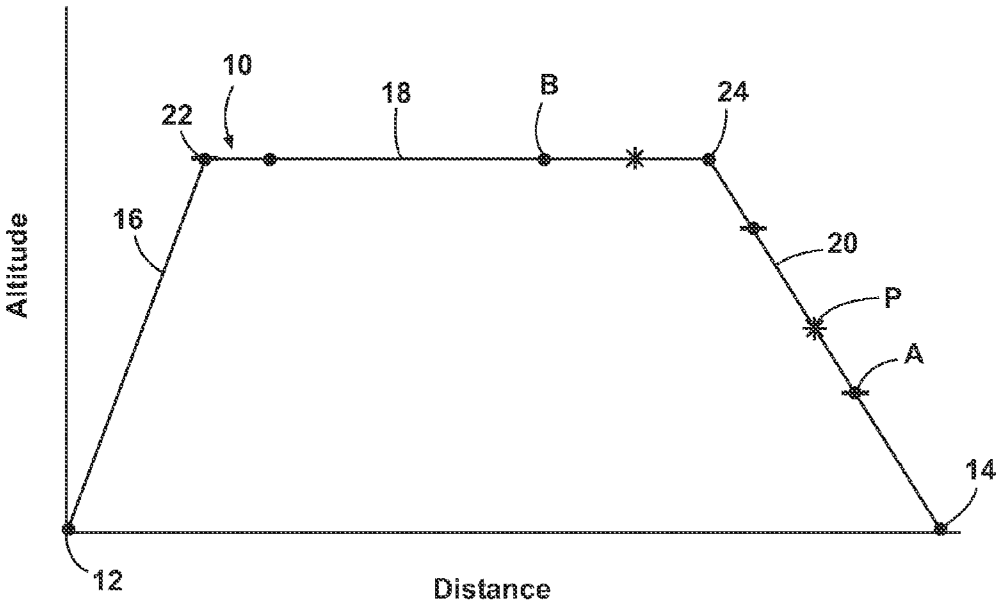
FIG. 1 is a schematic graphical illustration of an aircraft trajectory for implementing a flight path for an aircraft.

FIG. 1 is a schematic illustration of flight path for an aircraft in the form of an aircraft trajectory 10. The trajectory begins at a trajectory start point 12, such as the departure airport, and ends at a trajectory endpoint 14, such as a destination airport. Traversing between the start point 12 and end point 14 includes a climb phase 16, a cruise phase 18, and a descent phase 20, which are all included in the trajectory 10.

The climb, cruise and descent phases are normally input into an FMS as data points. For purposes of this description, the term data point may include any type of data point including waypoints, enroute waypoints, and altitudes and is not limited to a specific geographic position. For example, the data point may just be an altitude or it may be a specific geographic location, which may be represented by any coordinate system, such as longitude and latitude. By way of non-limiting example a data point may be 3-D or 4-D; a four dimensional description of the aircraft trajectory 10 defines where in 3D space the aircraft is at any given point of time. Each of the data points may include associated information, such as weather data that may include temperature data and wind data.

For the climb a data point corresponding to the altitude A at the top of the climb 22 may be input; for the cruise enroute waypoints B may be input; and for the descent various altitudes may be input from the top of descent 24. After takeoff, an aircraft typically remains in the climb phase 16 up to the top of the climb 22 and then it follows the enroute waypoints during the cruise phase 18 to the top of the descent 24 where it then starts the descent phase 20. The altitudes A in the climb phase 16 and the descent phase 20 are waypoints in the sense that the aircraft is achieving its trajectory 10 to such altitudes during these phases. The enroute waypoints B may be selected based upon the location of ground navigation aids (Navaids) along the trajectory 10 of the aircraft. It may be understood that during the cruise phase 18 there may be some changes in altitude especially for transcontinental flights where an aircraft may change its elevation to take advantage of or minimize the impact of prevailing winds, such as the jet stream, to climb to higher altitudes as fuel is burned, or to avoid turbulence.

Additional data points, such as Pseudo-waypoints P, may also be included in the trajectory 10 and are artificial reference points created for some purpose relevant to a parameter of the trajectory 10 and are not limited to ground navigation aids. They can be defined prior to or after established data points for the trajectory have been set. Pseudo-waypoints can be defined in various ways, such as by latitude and longitude or by a specified distance along the current trajectory, such as an along-track waypoint.

The weather data may be entered for any of the data points. Such weather data improves FMS flight predictions. The weather data may be obtained from a weather database which may contain real-time weather data or forecasted weather data. Such weather databases may contain information regarding certain weather-related phenomena (e.g., wind speed, wind direction, temperature, among others) and data pertaining to visibility (e.g., foggy, cloudy, etc.), precipitation (rain, hail, snow, freezing rain, etc.) and other meteorological information. Because air temperature and wind must be accurately accounted for in trajectory calculations to ensure that the aircraft will conform to the predicted trajectory, the weather database may include 3-D real-time temperature and wind models of the local airspace as well as 4-D forecasted data. The weather database may store such real-time or forecasted weather data based at a specific latitude, longitude, and altitude.

While it is typically most accurate to use weather data from a data point from the weather database corresponding to the desired data point on the trajectory, not every latitude, longitude and altitude may be accounted for in the database and there may be a finer resolution of weather data for points over land in the United States and Europe, for example weather data every 2 km, and a reduced resolution for points over the Atlantic Ocean. Each data point of the weather database does not necessarily lie on the trajectory 10. When the weather database does not have a data point that corresponds to the data point on the trajectory, the available weather data may be interpolated to obtain weather data lying on the trajectory and the interpolated weather data may be entered into the FMS. Alternatively, the weather data from the closest weather data point for the data point on the trajectory may be entered into the FMS.

It is important to have accurate weather data because close representation of weather profiles in the vicinity of an aircraft's trajectory will produce more accurate FMS predictions, thereby resulting in improved estimations of aircraft fuel usage and arrival time. The more up-to-date the weather data is that is used to prepare the weather profiles the more accurate the weather profile.

However, the ability to submit all relevant weather data from the weather database to the FMS from a ground station may be restricted by the FMS itself as the FMS typically limits the number of data points on the flight trajectory for which weather data may be entered and ultimately used in the trajectory prediction. For example, an FMS may allow weather data to be inserted only at en route waypoints and also a limited number of altitudes in climb and/or descent. In many FMS, the total number of permitted data points is less than 10 while the weather database may have hundreds of relevant data points for the trajectory. Thus, providing accurate weather data may be a challenge because the FMS has a limited number of data points it may receive.

Further, the timeliness of the weather data is limited because the communication link from the ground to the aircraft may have a limited bandwidth available for transmitting extensive weather data relative to the flight trajectory of the aircraft, and, in any event, it may be costly to communicate large amounts of digital data to the aircraft. Most current systems are subscription-based, which have relatively high associated fees for data transmission. By way of non-limiting example, there is currently a charge per character or byte sent over ACARS. Therefore, the cost of communicating up-to-date weather data to the FMS is also a practical limitation. The lack of up-to-date weather data becomes more of an issue as the duration of the flight increases.

The most accurate trajectory prediction by the FMS would be one which used all of the weather data available along the flight path trajectory 10. However, the limit on data points that may be entered into the FMS, the cost of sending data real-time to the aircraft, and the lack of actual weather data along the flight plan place a practical limitation on the accurate weather data being used in the FMS and the real-time updating of the weather data. The method descried below addresses the restrictions associated with these practical limitations by providing a reduced set of weather data points to the FMS that retain key weather attributes and allow the FMS to improve its flight predictions based on such information.

An embodiment of the inventive method determines and sends to the FMS a reduced set of weather data points. More specifically, this embodiment may generally be described as selecting weather data points along the trajectory to form a trajectory subset, selecting a unique subset of temperature data from the trajectory subset, generating a temperature profile from the temperature subset, comparing the temperature profile to the trajectory subset, and repeating the selection of a unique temperature subset, generating a temperature profile and comparing it to the trajectory subset until the comparison satisfies a predetermined threshold and then identifying the weather data points that correspond to the unique subset of temperature data which satisfies the predetermined threshold and sending those weather data points to the FMS.

Figure 2:
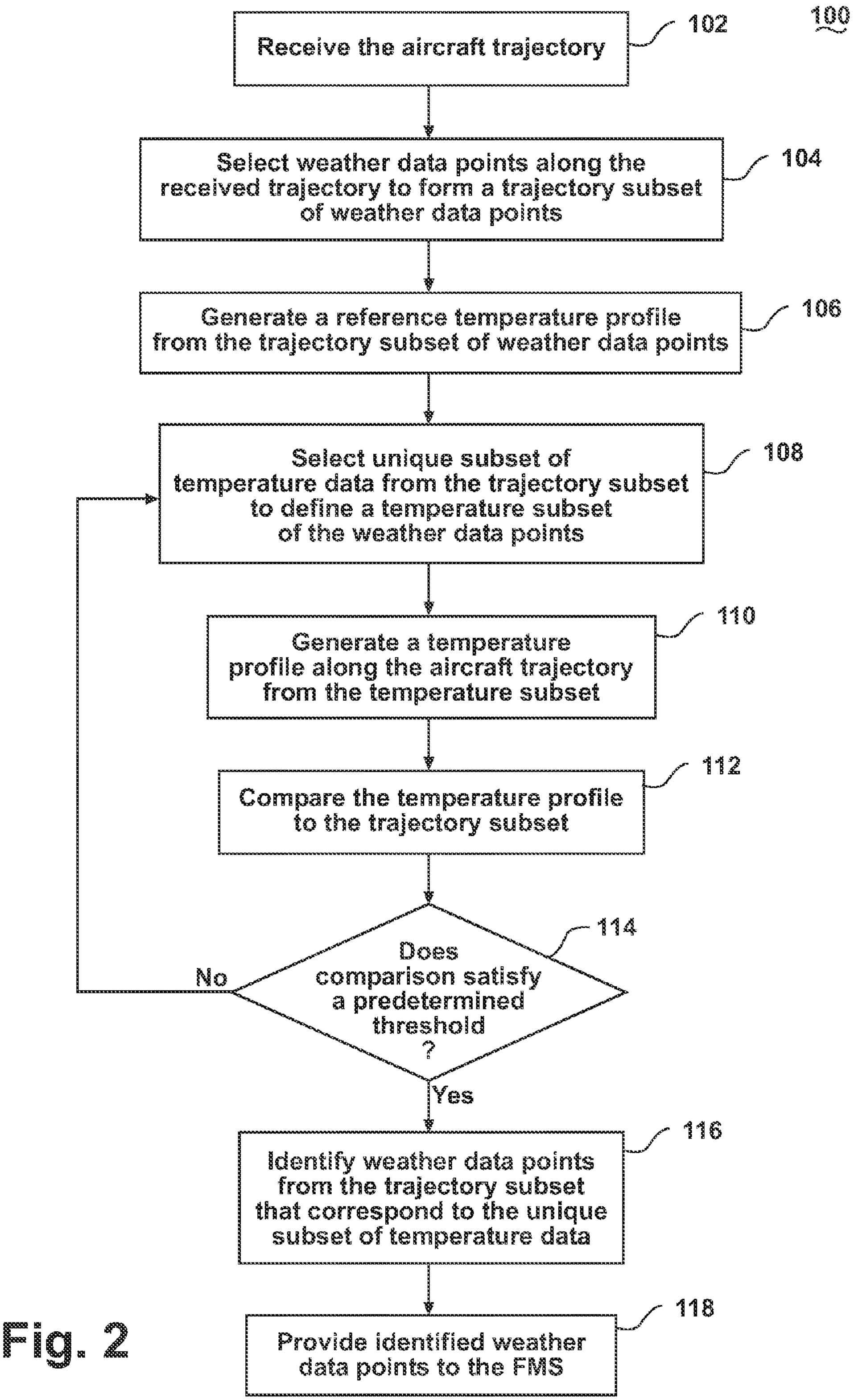
FIG. 2 is a flow chart of a method according to an embodiment of the invention.

In accordance with an embodiment of the invention, FIG. 2 illustrates a method 100 of providing a reduced subset of weather data points for an aircraft trajectory to the FMS. The sequence of steps depicted is for illustrative purposes only, and is not meant to limit the method 100 in any way as it is understood that the steps may proceed in a different logical order or additional or intervening steps may be included without detracting from the invention. It is contemplated that such a method 100, or portions of the method 100, may be carried out in a system on the ground and that the relevant output may be sent to the FMS of the aircraft via a communication link.

The method 100 begins with receiving the predicted aircraft trajectory at 102. This may include receiving start and endpoints as well as waypoints, which define the trajectory. The trajectory may be predicted by the FMS on the aircraft and down-linked to the ground system, or it may be generated by a separate ground-based trajectory prediction system.

At 104 the trajectory is processed and weather data points along the received trajectory are selected from a full weather database to form a trajectory subset of weather data points. Essentially, the weather forecast database is queried for the data points along the trajectory. This may include the selection of weather data points associated with the waypoints of the trajectory. The weather forecast data should be in 3D or 4D formats in the region of the trajectory corresponding to the 3D or 4D trajectory used. In this manner, weather forecast data points may be extracted along the received trajectory from a weather forecast database to form a trajectory subset of weather forecast data points. Such a trajectory subset of weather data points includes more weather data than an FMS would be able to use, that is the data points in the trajectory subset will include more points than the enroute waypoints and/or altitudes.

The system will obtain weather data along the trajectory from the weather database, which may be located on a weather server accessible through a weather database if it is part of the system, or from a weather provider for a 3 or 4 dimensional weather update along the trajectory. The weather data point may be considered to be along the trajectory if the weather data point is within a predetermined geographical distance from the trajectory. By way of non-limiting example, the weather data points extracted for a specific trajectory may be within 2-5 kilometers of the location of the trajectory. In a case where there is not weather data associated with a data point, interpolation between the two closest weather data points may be used. Thus, the trajectory weather data points may include only weather data points lying on the aircraft trajectory and interpolated weather forecast data points. The weather data points may include a spatial position with associated weather data. The weather data may include at least one of: wind speed, wind direction, air temperature, humidity, and barometric pressure data elements.

At 106 temperature data is extracted from the trajectory subset of weather data points and a reference trajectory temperature profile is generated therefrom. Generating the reference trajectory temperature profile may include performing a curve fit of the temperature data of the trajectory subset of data points. Any suitable curve-fitting method may be used.

At 108 a unique subset of temperature data points is selected from the trajectory subset of weather data points to define a temperature subset of the trajectory weather data points. That is the system extracts a unique subset of temperature data from those trajectory weather data points to form the temperature subset. Selecting the unique subset of temperature data points may include selecting a number of temperature data points not greater than a number of data points that can be entered into the FMS.

At 110 a temperature profile may be generated along the aircraft trajectory from the unique subset of temperature data points. Generating the temperature profile may include performing a curve fit of the unique subset of temperature data points. Any suitable curve-fitting method may be used. The method 100 continues at 112 with comparing the temperature profile with the reference temperature profile generated at 106. The comparison may include determining an error or a residual between the temperature profile and the reference trajectory temperature profile.

At 114 it is determined if the comparison satisfies a predetermined threshold. The term “satisfies” the threshold is used herein to mean that the difference satisfies the predetermined threshold, such as being equal to or less than the threshold value. It will be understood that such a determination may easily be altered to be satisfied by a positive/negative comparison or a true/false comparison. The threshold may be experimentally determined and it is contemplated that a user may fine tune the predetermined threshold for the approximated profile to suit their needs. For instance, in a shorter flight, it may be acceptable to have larger errors because the errors are not propagated for as much time as they would in a longer flight.

If the comparison does not satisfy the threshold value, then the method 100 returns to 108 where an updated unique subset of temperature data is selected to define an updated temperature subset, an updated temperature profile is generated at 110 from the updated unique subset of temperature data, that updated temperature profile is compared to the reference trajectory temperature profile at 112, and it is determined again if the comparison satisfies the predetermined threshold. These steps are repeated until the comparison satisfies the threshold. Alternatively, it is contemplated that instead of the comparison satisfying the threshold that the steps may be repeated until all unique subsets of temperature data have been evaluated or any other appropriate exit criteria is met.

In the case where the comparison determines an error between the temperature profile and the reference temperature profile it is contemplated that satisfying the predetermined threshold may include the determined error being less than a predetermined amount. Alternatively, satisfying the predetermined threshold may include finding the unique subset with the lowest error. Finding such a unique subset of temperature data points may include substituting out one point in the subset for another point or adding additional temperature data points to the unique subset. It is contemplated that such variations of the unique temperature subset may be run until the one with the least errors or errors below the predetermined threshold are found.

Constraints such as a minimum distance from any other point in the subset may be considered. The above method may also take into account various user constraints and will optimize the unique subset of temperature data points for a given set of user constraints. By way of non-limiting example, a data point threshold may be set by the user that defines the maximum number of data points that can be sent to the FMS. By way of non-limiting example, a FMS system may have a predetermined data point threshold of five weather data points; thus, a data point threshold may be set by the user to limit the amount of data points in the subset of temperature data points. A user may set a limit less than the amount of data points the FMS may accept for cost reasons.

Once the comparison does satisfy the threshold the method continues on to 116 where weather data points are identified from the trajectory weather data subset that correspond to the unique subset of temperature data point satisfying the predetermined threshold. That is the weather data points having a spatial position with associated weather data, which may include wind speed, wind direction, air temperature, humidity, and/or barometric pressure data elements that correspond to the unique subset of temperature data points are identified.

At 118 the identified weather data points may be output to the FMS. It is contemplated that the information may be reformatted into a format required by the user, and that such reformatted information may be output at 118. For example, internal calculations used in the method 100 may use distance travelled as the weather location coordinate, but the FMS receiving the information my require weather inputs at specific latitude/longitude locations. Thus, it is contemplated that the method 100 may include a conversion between data representations to output the information in the proper format for the FMS.

It is contemplated that the identified weather data points may be calculated for at least one phase of the flight (climb 16, cruise 18, and descent 20) and that identified weather data points for the entire trajectory may be computed simultaneously or that each phase may be computed independently. It is contemplated that steps 104-118 are conducted at a ground station and wirelessly transmitted to the FMS on board the aircraft via a communication link at 118. It is contemplated that the identified weather data points may be transmitted to the aircraft while it is in flight or on the ground. Thus, the data sent to the FMS may include limited weather data which may best represent the weather which will be encountered during the flight of the aircraft.

Figure 3:
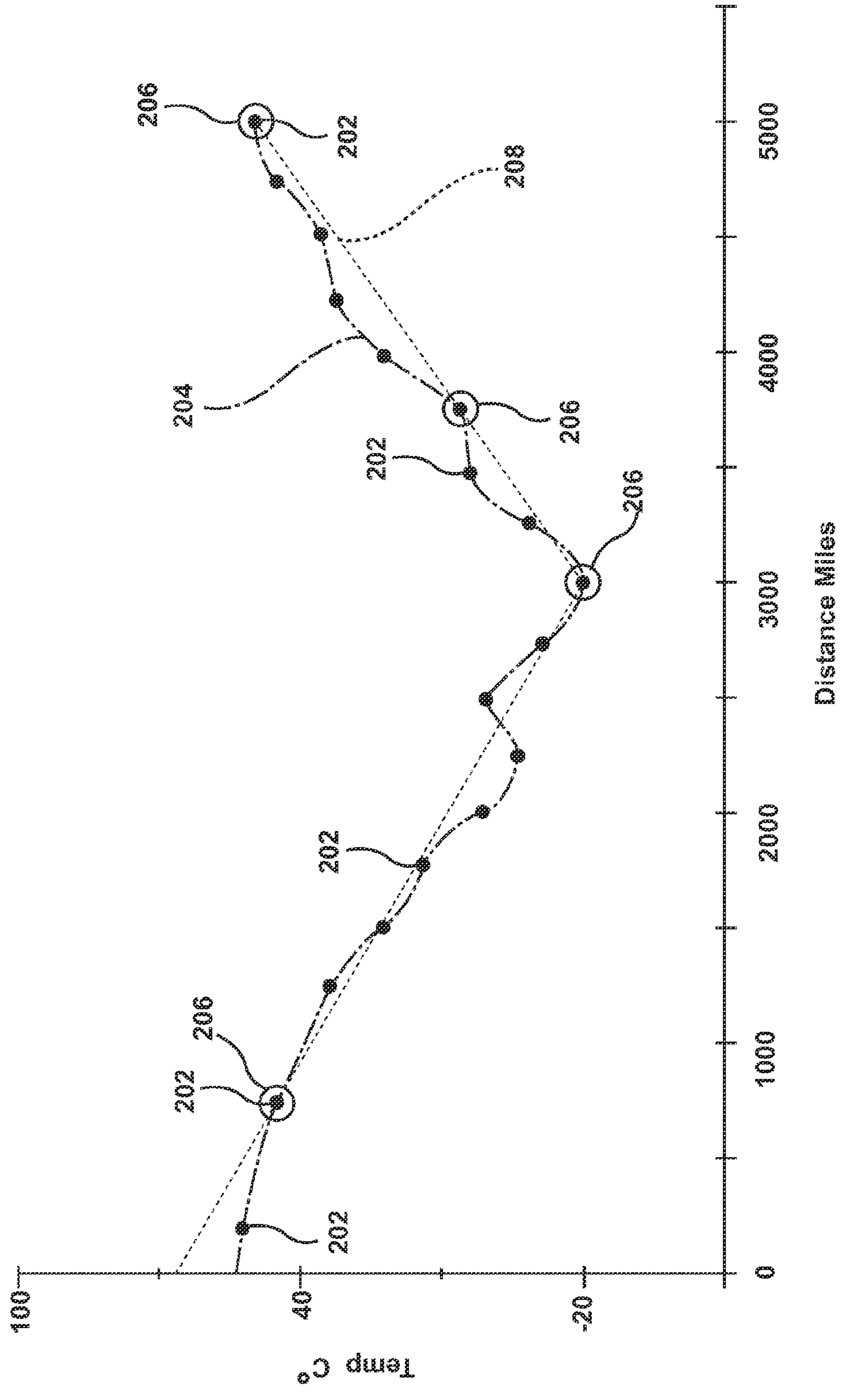
FIG. 3 is a graphical illustration of exemplary temperature data, a reference temperature profile, a selected unique subset of temperature data, and a temperature profile generated from the unique subset of temperature data according to the flow chart in FIG. 2.

By way of non-limiting example, FIG. 3 graphically illustrates temperature data 202 from a trajectory subset of weather data points and a reference trajectory temperature profile 204 generated therefrom. Also illustrated are a unique subset of temperature data points 206 and a temperature profile 208 generated from the temperature subset 206. As may be understood different unique subsets of temperature data points 206 may be selected until the residual between the temperature profile 208 and the reference trajectory temperature profile 204 satisfies the predetermined threshold.

The above described embodiments process large-scale weather information and compute a reduced data set to be provided to the FMS. The invention takes into account that many FMSs have limited memory available to store this data and can receive only a limited number of elements for use in the trajectory prediction. Such identified weather data points allow the FMS to create a more accurate trajectory based on reduced weather information for weather that will be encountered during the flight of the aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing weather information for an aircraft trajectory to a flight management system (FMS), the method comprising:

a) receiving the aircraft trajectory;

b) selecting weather data points comprising both temperature and wind data along the received aircraft trajectory from a weather database to form a trajectory subset of weather data points;

c) generating a reference trajectory temperature profile from the trajectory subset of weather data points;

d) selecting, by a ground station, a unique subset of temperature data from the trajectory subset to define a temperature subset of the weather data points;

e) generating, by the ground station, a temperature profile along the aircraft trajectory from the temperature subset;

f) comparing, by the ground station, the temperature profile to the reference trajectory temperature profile to determine an error between the reference trajectory temperature profile and the temperature profile;

g) repeating, by the ground station, d-f until the error satisfies a predetermined error threshold;

h) identifying, by the ground station, the weather data points from the trajectory subset that correspond to the unique subset of temperature data satisfying the predetermined error threshold; and i) sending, by the ground station, to the FMS the identified weather data points.

2. The method of claim 1 wherein the receiving the aircraft trajectory comprises receiving waypoints defining the trajectory.

3. The method of claim 2 wherein the selecting weather data points comprises extracting weather data points associated with the waypoints.

4. The method of claim 3 wherein weather data points are associated with the waypoints when a weather data point is within a predetermined distance from the waypoint.

5. The method of claim 1 further comprising providing interpolated weather forecast data points on the aircraft trajectory from the weather forecast data points not lying on the aircraft trajectory.

6. The method of claim 5 wherein the trajectory subset of weather data points comprises only weather data points lying on the aircraft trajectory and interpolated weather forecast data points.

7. The method of claim 1 wherein generating the reference trajectory temperature profile comprises performing a curve fit of the temperature data of the trajectory subset of weather data points.

8. The method of claim 7 wherein generating the temperature profile comprises performing a curve fit of the temperature subset.

9. The method of claim 1 wherein the satisfying the predetermined threshold comprises the determined error being less than a predetermined amount.

10. The method of claim 1 wherein the satisfying the predetermined threshold comprises finding the unique subset with a lowest error.

11. The method of claim 1 wherein the selecting the unique subset of temperature data comprises selecting a number of temperature data not greater than a number of data points that can be entered into the FMS.

12. The method of claim 1 wherein the aircraft trajectory comprises multiple phases and the identified weather data points are provided for at least one of the phases.

13. The method of claim 12 wherein the multiple phases comprise at least one of a climb phase, a cruise phase, and a descent phase.

14. The method of claim 1 wherein b-i are conducted at a ground station and wireless transmitted to the FMS.

15. A method of providing weather information for an aircraft trajectory to a flight management system (FMS), the method comprising:

a) receiving the aircraft trajectory;

b) selecting weather data points comprising both temperature and wind data along the received trajectory from a weather database to form a trajectory subset of weather data points;

c) generating a reference trajectory temperature profile from the trajectory subset of weather data points;

d) selecting, by a ground station, a unique subset of temperature data from the trajectory subset to define a temperature subset of the weather data points;

e) generating, by the ground station, a temperature profile along the aircraft trajectory from the temperature subset;

f) comparing, by the ground station, the temperature profile to the reference trajectory temperature profile to determine a residual between the reference trajectory temperature profile and the temperature profile;

g) repeating, by the ground station, d-f until the residual satisfies a predetermined residual threshold;

h) identifying, by the ground station, the weather data points from the trajectory subset that correspond to the unique subset of temperature data satisfying the predetermined residual threshold; and i) sending, by the ground station, to the FMS the identified weather data points.

* * * * *